United States Patent [19]

Johnston et al.

[11] Patent Number: 4,951,927

[45] Date of Patent: Aug. 28, 1990

[54] METHOD OF MAKING AN ENCAPSULATED MULTIPLE GLAZED UNIT

[75] Inventors: Norman W. Johnston; Edward W. Curtze, both of Perrysburg, Ohio

[73] Assignee: Libbey-Owens-Ford Co., Toledo, Ohio

[21] Appl. No.: 311,420

[22] Filed: Feb. 15, 1989

Related U.S. Application Data

[63] Continuation of Ser. No. 48,487, May 5, 1987, abandoned, Continuation of Ser. No. 710,213, Mar. 11, 1985, abandoned.

[51] Int. Cl.[5] ...................... B29C 45/14; B29C 45/16; B29C 45/76

[52] U.S. Cl. .................................... 264/129; 264/135; 264/252; 264/261; 264/263; 264/277

[58] Field of Search ..................... 264/40.3, 40.5, 252, 264/261, 263, 277, 129, 135; 425/387.1, 390, 395, 400

[56] References Cited

U.S. PATENT DOCUMENTS

| | | | |
|---|---|---|---|
| 3,381,340 | 5/1968 | Chaplin | 364/261 |
| 3,703,425 | 11/1972 | Delmonte et al. | 264/261 |
| 4,151,696 | 5/1979 | Knights | 264/261 |
| 4,237,597 | 12/1980 | Auger | 264/261 |
| 4,249,517 | 2/1981 | Schroeder | 264/46.4 |
| 4,259,135 | 3/1981 | Kulla | 264/263 |
| 4,336,009 | 6/1982 | Wolf | 425/116 |
| 4,429,509 | 2/1984 | Vachet et al. | 52/788 |
| 4,431,691 | 2/1984 | Greenlee | 428/34 |
| 4,561,625 | 12/1985 | Weaver | 264/252 |
| 4,626,185 | 12/1986 | Monnet | 264/314 |
| 4,648,832 | 3/1987 | Reilly | 425/116 |
| 4,695,420 | 9/1987 | Grawey et al. | 264/328.6 |

FOREIGN PATENT DOCUMENTS 675147 7/1952 United Kingdom .

*Primary Examiner*—Jay H. Woo
*Assistant Examiner*—Jeremiah F. Durkin, II
*Attorney, Agent, or Firm*—Marshall & Melhorn

[57] ABSTRACT

An encapsulated multiple glazed structure is formed by positioning at least two spaced apart substantially coextensive sheets of glazing material wherein the sheets are maintained in aligned spaced relation by a suitable spacer element adjacent the peripheral portions of the facing surfaces of the glazing sheets. The above assemblage is then typically placed within a mold cavity of a suitable molding apparatus and a charge of an elastomeric gasket forming material is injected therein to form an encapsulating gasket around the peripheral edge portions of the assemblage to produce a multiple glazed structure.

3 Claims, 4 Drawing Sheets

METHOD OF MAKING AN ENCAPSULATED MULTIPLE GLAZED UNIT

This application is continuation of application Ser. No. 07/048,487, filed May 5, 1987, now abandoned which is a continuation of applications Ser. No. 06/710,213, filed Mar. 11, 1985, now abandoned.

BACKGROUND OF THE INVENTION

1. Field of the Invention

The invention relates to an encapsulated multiple sheet or insulating glass glazing unit and method of fabricating the same.

2. Description of the Prior Art

Multiple glazing units generally comprise two or more sheets of glass spaced from one another to provide an insulating air space in the zone between the facing surfaces of the sheets. This air space is effective to reduce the transmission of heat energy through the unit due to conduction and convection. In one typical form of multiple glazed window, the sheets of glass are spaced from each other by a metal marginal edge spacer element extending around the periphery of the glass sheets. The glass sheets are generally adhered to the spacer element by a mastic composition forming a continuous film around the marginal edges of the sheets, between each sheet and the spacer element, to produce a primary hermetic seal. The spacer element is typically formed to hold a desiccant. Openings may be provided in the spacer element to establish communication between the air space of the unit and the desiccant so that moisture from the air within the unit may be absorbed by the desiccant. A resilient moisture resistant spacer element having a layer of mastic adhered thereto is preferably disposed around the peripheral edges of the glass sheet and the spacer element to provide a secondary hermetic seal. And finally, a channel member of substantially U-shaped cross-section is preferably affixed around the periphery of the unit to protect the peripheral edges of the glass sheets forming the unit.

A conventional method of assembling multiple glazed units, as described above, involves the application of the layer or bead of mastic that forms the primary hermetic seal along two opposite sides of the metal spacer element which is adapted to engage the inner facing surfaces of the glass sheets about the marginal edges thereof. The spacer element is then disposed between two preformed glass sheets, and the sheets are thereafter pressed together to cause the sheets to adhere to the spacer element and seal the internal air space between the facing surfaces of the sheets from the atmosphere. The final air space between the two sheets of glass is a function of the thickness of the spacer element and the thickness of the mastic layers between each side of the spacing element and the adjacent glass sheet.

A layer of mastic or a resilient, moisture-resistant strip with a layer of mastic adhered thereto is then placed around the peripheral edges of the sheets of glass and the spacer element to form the secondary hermetic seal. A channel member formed of metal, such as stainless steel, for example, is thereafter affixed around the periphery of the unit. The angle that the flanges or sides of the channel member form with the central or web portion of the channel member is slightly less than 90 degrees. When the channel member is affixed to the edges of the glass sheets, the sides are held apart to allow the glass to be inserted therebetween. The sides are then released permitting them to spring back into contact with the faces of the glass sheets and is maintained in such position under tension. The foregoing, as well as other similar multiple glazed window constructions, is fully disclosed and illustrated in U.S. Pat. Nos. 2,838,810, 2,964,809, and 3,280,523.

Also, another type of multiple glazed unit and method of forming the same is illustrated and described in U.S. Pat. No. 2,624,979. The structure therein described employs at least two spaced apart sheets of glass wherein the peripheral edges of the top sheet are heated until they soften sufficiently to cause them to sag into contact the facing peripheral surface of the adjacent lower sheet. The glass in the region of contact at the marginal areas is heated to affect a sufficient degree of softening to cause a fusion between the mating glass surfaces to form a continuous weld around the innermost zone. The unit is then typically annealed and finally may be placed in a preformed frame assembly preparatory to being mounted in an opening of a building, for example.

Typically, the manufacture of the above multiple glazed insulating glass units requires a number of manufacturing and handling steps, preparatory to being ready for insertion into a building opening.

SUMMARY OF THE INVENTION

This invention relates to an insulated structure and method of fabricating such structure. In one of its broadest embodiments, this invention contemplates a multiple glazed unit including at least a pair of spaced apart sheets of frangible glazing material, and a polymeric frame adhered to predetermined portions of the peripheral marginal edges of the sheet material to produce a hermetically sealed zone between the facing surfaces of the sheet material, the frame material having been polymerized and cured in contact with the sheet material and having assumed by the autogenous pressure incident to its polymerization, while confined, intimate contact with the portions of the sheet material to which it is adhered.

Also, this invention contemplates the method of fabricating a multiple glazed unit which includes the steps of positioning at least a pair of optically transparent glass sheets in superposed spaced relation; introducing spacer means to define a zone between opposed facing surfaces of the sheets; providing a mold cavity in surrounding and overlapping relation to the peripheral marginal edges of the superposed spaced sheets; injecting into the mold cavity a composition which is capable of polymerization and curable to produce a frame about the marginal edges of the sheets to hermetically seal the zone between the facing surfaces of the sheets; controlling the pressure at which the composition is injected into the cavity to one sufficiently low that the sheet material is not damaged; controlling the temperature of the mold cavity, the injection of the composition, and the amount of the composition injected so that the composition polymerizes, after its injection, develops intimate contact with the mold cavity and with the sheet material, and cures while in such contact; and removing the assembly from the mold cavity.

In general, the invention contemplates an optically transparent insulating assembly which can readily be installed with facility into the opening of a structure. The mechanism for effecting the hermetic seal between the facing surfaces of transparent sheet material simultaneously functions as means to maintain the desired spacing of the individual sheets one from another, structurally bond the sheets together, and functions as an architectural frame having any desired dimensional configuration and decorative appearance.

BRIEF DESCRIPTION OF THE DRAWINGS

The above, as well as other, objects and advantages of the invention, will become readily apparent to one skilled in the particular art from reading the following detailed description of a preferred embodiment of the invention when considered in the light of the accompanying drawings, in which.

DETAILED DESCRIPTION OF PREFERRED EMBODIMENT OF THE INVENTION

Figure 1:
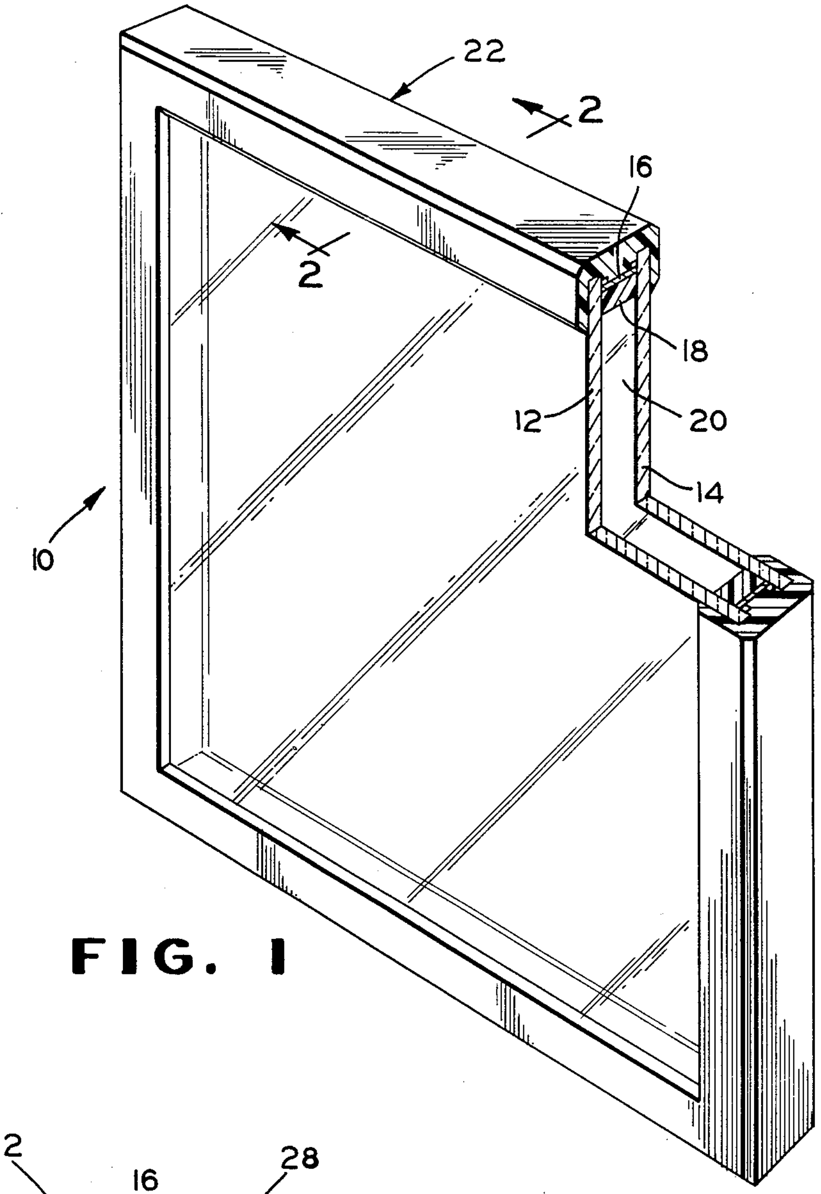
FIG. 1 is a perspective view of a multiple glazed unit embodying the features of the invention with portions broken away to more clearly illustrate the structure.
Figure 2:
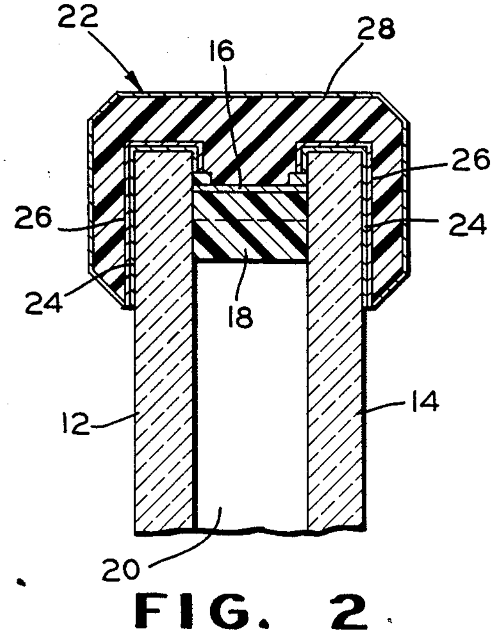
FIG. 2 is a fragmentary sectional view of the sealing structure of the invention taken along line 2—2 of FIG. 1.
Figure 3:
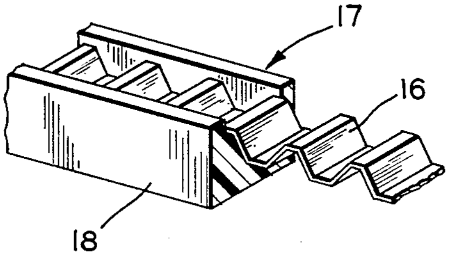
FIG. 3 is a fragmentary perspective sectional view of the edge spacer unit.
Figure 4:
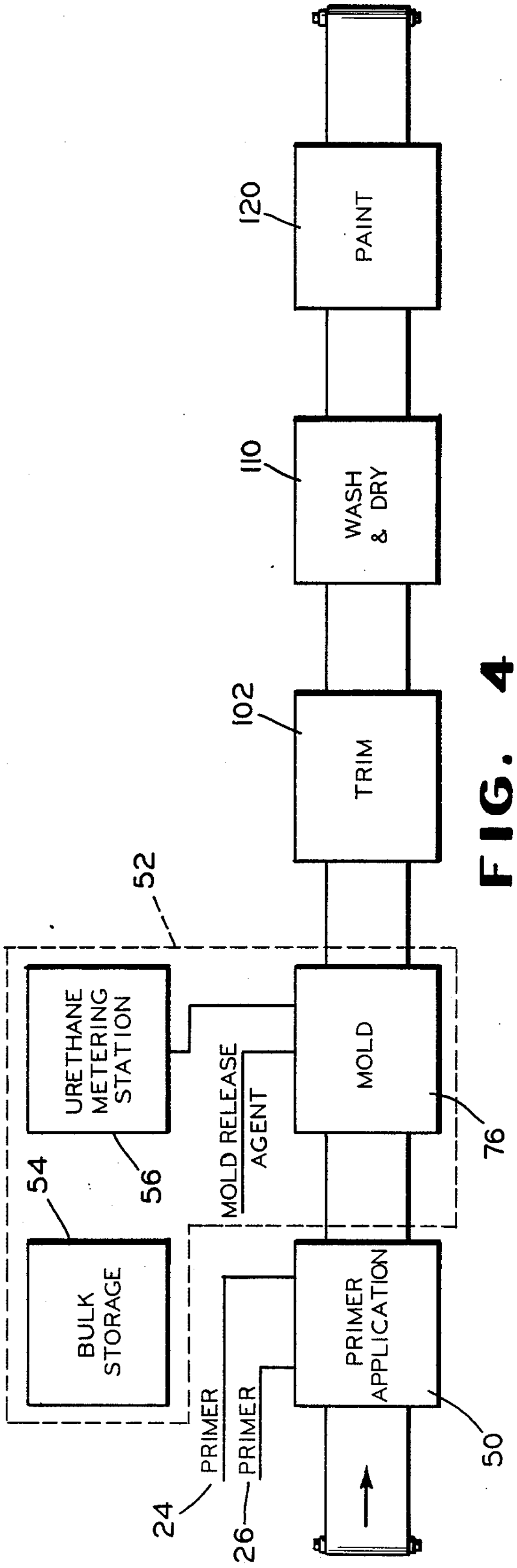
FIG. 4 is a schematic view showing the preferred process for producing the encapsulated insulating glazing structure illustrated in FIGS. 1, 2, and 3.
Figure 5:
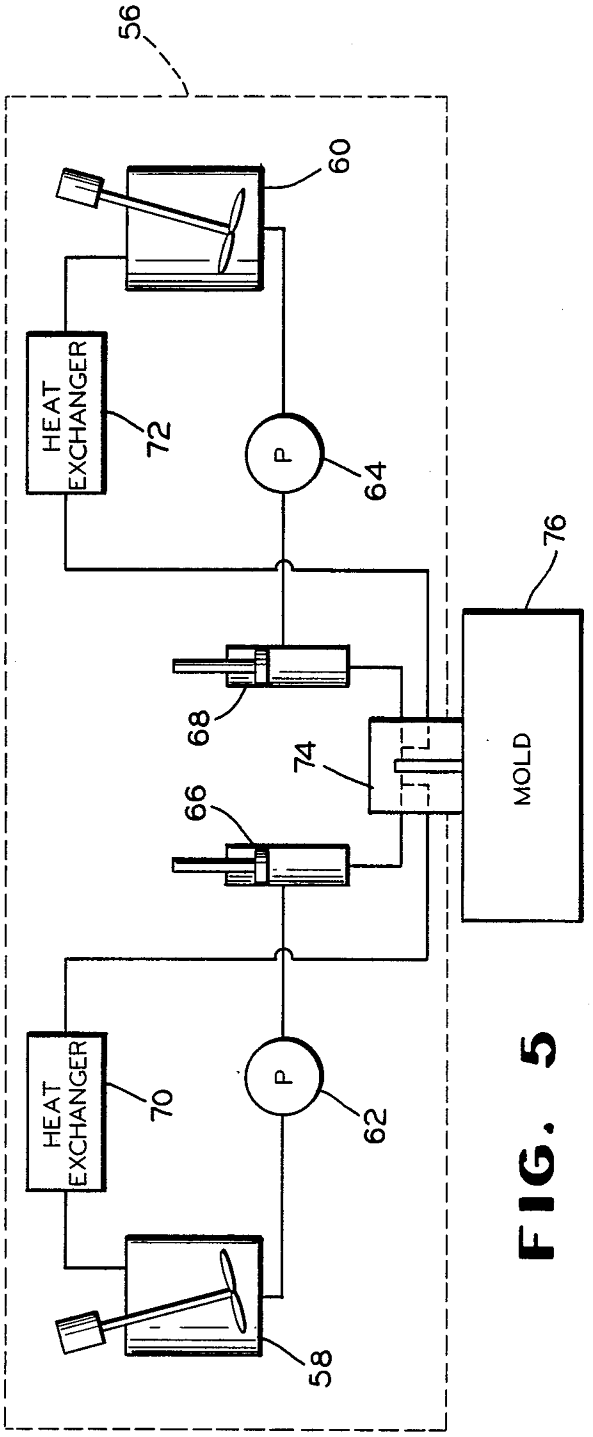
FIG. 5 is a more detailed schematic view showing the basic component utilized in practicing the process illustrated in FIG. 4.

Referring to FIGS. 1, 2, and 3, there is illustrated a multiple glazed unit 10 incorporating the features of the invention and fabricated by the method of the invention. In the illustrated embodiment, the insulating unit 10 includes a pair of sheets of glass, indicated by reference numerals 12 and 14, which are maintained in spaced relation by an elongate spacer strip unit 17. The spacer strip unit 17 is adapted to form a continuous band around the marginal edges of the facing surfaces of the glass sheets 12 and 14 to effectively form a dead air space 20 between the glass sheets 12 and 14. The entire assembly is framed by a formed frame member 22 of a polymeric material which is polymerized and cured in situ to encapsulate the marginal peripheral edge portions of the assemblage. The frame member 22 is typically formed by a reaction injection molding process.

FIG. 3 shows the spacer strip unit 17 which may be employed in the embodiment illustrated by FIGS. 1 and 2. The edge spacer unit 17 is commercially available from Tremco, and sold under the Trademark Swiggle Strip. The spacer strip unit 17 consists of a self-contained spacer member 16 which may be any flexible, yet rigid material, such as corrugated aluminum and a desiccant containing material 18. The desiccant containing material 18 is formed of an extruded butyl based mastic containing a powdered molecular sieve desiccant dispersed throughout. Any combination of mastic and desiccant can be used which possesses properties suitable for employment in this invention. These properties could include, for example, chemical compatibility with the other components of the invention, ability to adhere to the sheet, frame and spacer strip materials, facility in assisting in forming and maintaining a hermetic seal, stability over a wide range of application conditions, and the capacity to prevent condensation formation in the associated hermetically sealed area.

The initial step in producing the multiple glazed unit 10 involves the appropriate cleaning of the front and rear surfaces, and peripheral edges of the glass sheets 12 and 14 to prepare the surfaces for adherence with material to be employed for the frame member 22.

The next step in producing the unit 10 is the application of a primer coating to the previously cleaned glass surfaces. Satisfactory results can be achieved by initially employing a primer layer 24 of a product such as "Betaseal, Glass Primer 43518 Commercial Grade" commercially available from Essex Chemical Company. The glass bond area is initially wiped with the primer to form the layer 24 which functions as a coupling agent. The primer material is a clear moisture-sensitive primer comprising gamma-aminopropyltriethoxysilane, which promotes adhesion between other Betaseal products and glass.

Following the application of the layer 24, a second primer layer 26 is applied over the layer 24. Primer layer 26 assists the rapid formation of a hydrolytically stable bond between the glass and associated frame 22 of polyurethane, for example. The material comprising layer 26 is a primer, such as for example, a blackout primer, which functions to prevent ultraviolet degradation of sealants and adhesives, or a primer to be used in conjunction with a frame 22 which may itself be a stable polyurethane. An example of the aforementioned blackout primer is commercially available under the description "Betaseal, Glass Primer 43520 Commercial Grade" from Essex Chemical Company.

Approximately twenty minutes after the superposed layers 24 and 26 have been applied, the final assemblage may be commenced. This period of time is necessary to allow sufficient reaction and drying of the primers. The precise period of time required is dependent upon the particular primers used. Initially, the glass sheet 12 is placed in a die cavity of an associated mold. The mold is a part of an apparatus subsequently described in detail with reference to the material illustrated in FIGS. 4 through 9. The spacer strip unit 17 is disposed, in continuous fashion, around the peripheral marginal edge portion of the glass sheet 12. Then, the glass sheet 14 is disposed in superposed relation over and aligned with the sheet 12. The spacer strip unit 17 functions to space the facing surfaces of the glass sheets 12 and 14 from one another at a predetermined desired distance, as well as cooperate to define a dead air space 20. An associated mold element, having a mold cavity formed therein to cooperate with the aforementioned cavity, is then placed over the lower mold and locked in a closed position. A charge of polyurethane reaction mixture is injected into the mold cavity to form a completely encircling frame member 22.

It is often desirable to apply a coating 28 to the outer exposed surface of the frame 22 before the multiple glazed structure is installed in an opening in a building or the like. The coating 28 can be a urethane based paint, containing any desired decorative color producing component such as pigment, for example. A type of urethane based paint useful for such purpose is one manufactured by PPG Industries, Inc. under the designation Purethane 700 HSE-848, for example. The paint coating 28 is then typically baked at approximately 140°-150° F. for about 20-30 minutes. It must be understood that in addition to the decorative effect, the layer 28 may function to protect the exposed polyurethane material forming the frame 22 from degradation which would otherwise be caused by exposure to ultraviolet radiation normally present in unfiltered sunlight. In the event the frame 22 is composed of an ultraviolet stable polyurethane material, the layer 28 may not be necessary, however it could be applied for decorative purposes.

The frame 22 of the preformed structure 10, above described, functions to insure the desired dead air space between the facing surfaces of the glass sheets 12 and 14 and holds the peripheral edges of the glass sheets 12 and 14 in tightly compressed state against the spacer strip unit 17. Also, the frame 22 may be formed in any desired cross-sectional configuration to accommodate existing window framing members of the double hung variety, as well as any other framing members.

Figure 10:
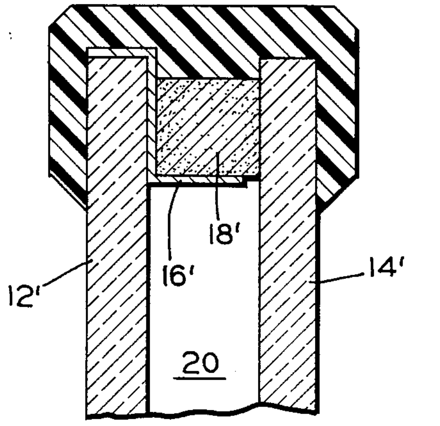
FIG. 10 is a fragmentary sectional view of the sealing structure of a second embodiment of the invention.

FIG. 10 shows an alternative embodiment of the structure illustrated in FIGS. 1 and 2 wherein similar structural elements are indicated with prime reference numerals. In this embodiment, the spacer element 16' is substantially shaped in cross-section in the form of the letter "Z", the upper portion is shaped to maintain mechanical contact with the peripheral edge of sheet 12' and the lower portion is shaped to maintain mechanical contact with desiccant 18' to hold it in position and yet allow the desiccant to communicate with the atmosphere in dead air space 20.

Figure 11:
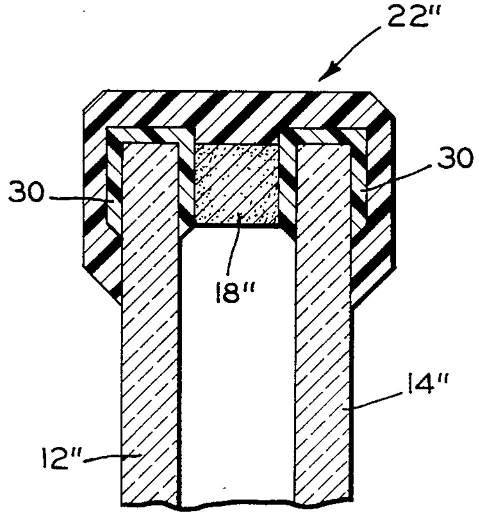
FIG. 11 is a fragmentary sectional view of the sealing structure of a third embodiment of the invention.

FIG. 11 shows a second alternative embodiment of the structure illustrated in FIGS. 1 and 2 wherein similar structural elements are indicated with double prime reference numerals. In this embodiment, each of the glass sheets 12'' and 14'' is provided with an encapsulating frame 30 applied thereto in the same manner in which the frame 22 is applied to the composite structure of FIGS. 1 and 2.

Subsequent to the application or formation of the frames 30 on the glass sheets 12'' and 14'', the sheets 12'' and 14'' are disposed in aligned superposed spaced relation. A spacing desiccant strip 18'' is employed to function as a spacer element to maintain the glass sheets 12'' and 14'' in a predetermined spaced relation during the time the final frame member 22'' is applied to produce an encapsulated composite multiple glazing insulation structure.

It will be manifest to those skilled in the art that the above described multiple glazed structure may be readily employed in new construction, but of equal importance, the invention provides an economical energy efficient insulating window structure for use in the rehabilitation of existing structures.

FIGS. 4 through 9 illustrate the method and apparatus employed to obtain the structural embodiments of the invention illustrated in FIGS. 1, 2, 10, and 11.

Referring now to FIGS. 4 through 9, the apparatus for producing the assembly 10 includes a primer station 50 and a molding station 52 (See FIG. 4) which comprises a bulk storage area 54 from which a stream which is a blend of polyol, a chain extender, e.g., ethylene glycol, pigment, and a catalyst and a separate stream of an isocyanate are delivered as required to a urethane metering station 56. The isocyanate from the bulk storage tank 54 is delivered to a conditioning tank 58, while the polyol blend is delivered to a tank 60. The outlets of the tanks 58 and 60 communicate with respective displacement cylinders or high pressure metering pumps 66 and 68 through respective recirculation pumps 62 and 64 to keep the material flowing at all times through the supply lines leading to a mixing head 74 and through recirculation lines to heat exchangers 70 and 72 and thence to the conditioning tanks 58 and 60. Heat exchangers 70 and 72 are employed in the system to maintain the desired reactant temperatures. Constant motion and temperature control are essential to keep various insoluble compounds which may be present in suspension, at temperatures at which the reactants remain inert and liquid, but at which they will react rapidly when brought together.

An injection system is provided to inject a charge composed of closely controlled portions of the two circulating streams into the mold in a smooth even flow. Measured charges of the two streams are delivered to mixing head 74 from the outlets of the displacement cylinders 66 and 68 respectively, by the action of pistons which are represented schematically. The injection into the mixing head 74 is under an applied pressure in the range of approximately 1000 to 3000 psi. The two streams are mixed thoroughly in the mixing head 74. The mixture is delivered therefrom to an associated mold 76 through an associated nozzle member 90, illustrated schematically in a retracted position in FIG. 6, at a pressure of approximately 50 to 100 psi. The mold is typically maintained at a temperature within the range of 140°-150° F.

The mold 76 is comprised of a lower section 78 (FIG. 6) and an upper section 80. Suitable means, not shown, are provided to open and close the mold sections 78 and 80. When the sections are open, the glass sheet 12 is positioned on the lower section 78 so that portions of the rear surface of the glass rest on appropriately positioned pads or seals 82. The pads or seals 82 define a part of the mold cavity and prevent the flow of the reaction mixture from the frame 22 to the center area of the sheets 12 and 14. After the glass sheet 12 is suitably positioned on the pads 82 of the lower mold section 78, the spacer strip unit 17 is disposed to continuously surround the marginal edge portions of the glass sheet 12. Next, the glass sheet 14 is suitably positioned in superposed spaced position over the glass sheet 12 and the spacer strip unit 17 so that the edges of the sheets 12 and 14 are in proper alignment. Then the upper section 80 is lowered into position so that the outer peripheral edges of the cooperating sections 78 and 80 can be clamped together in metal-to-metal contact outwardly of the mold cavity. The upper die section 80 of the mold carries pads 84 which function in cooperation with the pads 82 to press yieldingly against the glass sheet 14 and retain the same within the mold cavity. The cavity of the mold 76 is larger than the glass sheets 12 and 14 to avoid any glass-to-metal contact.

Figure 6:
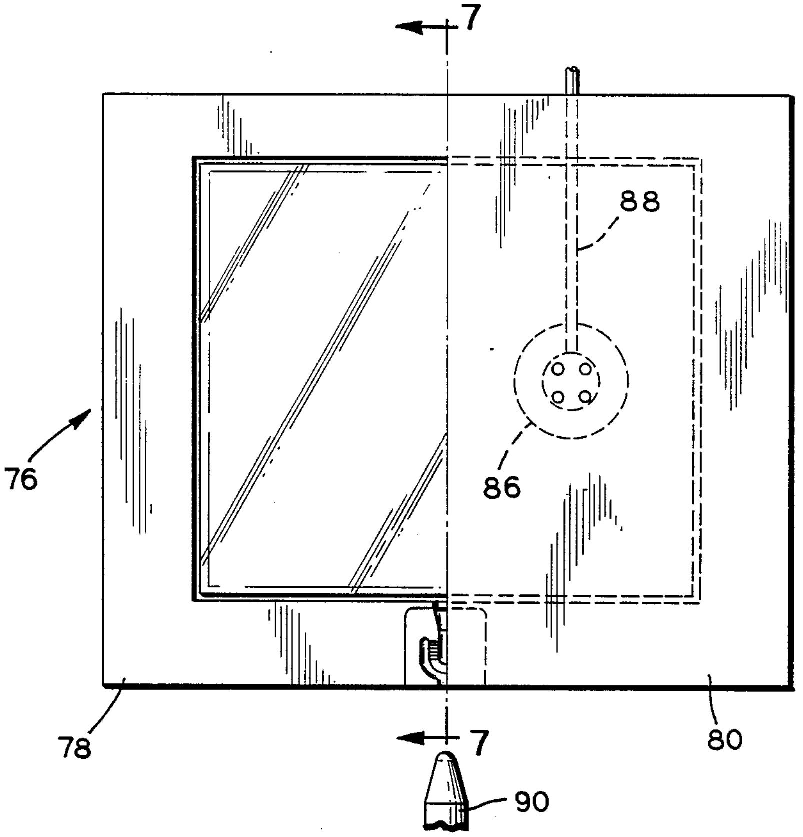
FIG. 6 is a top plan view of a typical mold designed to produce the encapsulated insulating structure of FIGS. 1, 2, and 3.
Figure 7:
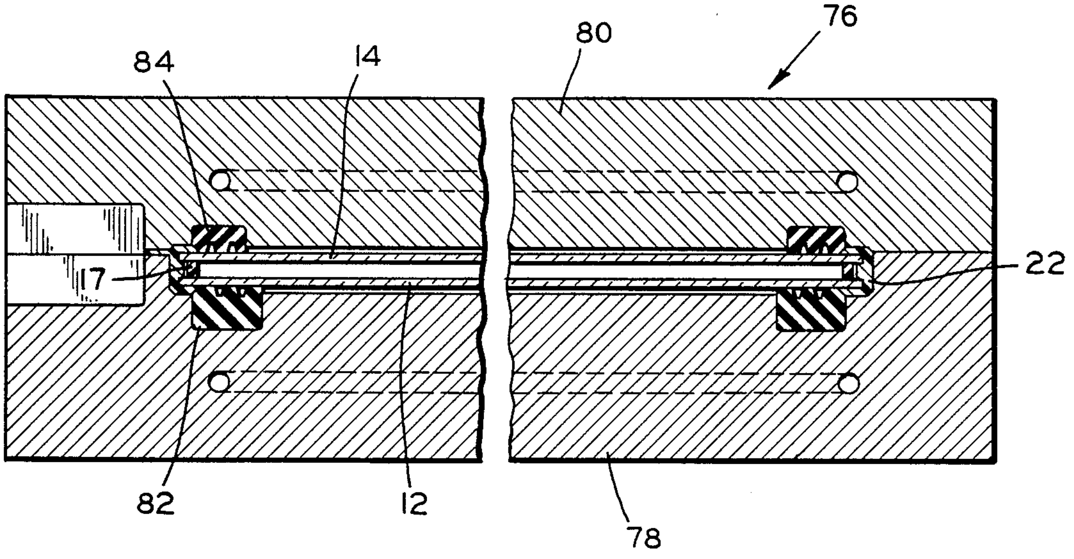
FIG. 7 is an enlarged fragmentary sectional view of the mold structure illustrated in FIG. 6 taken along line 7—7 thereof.
Figure 8:
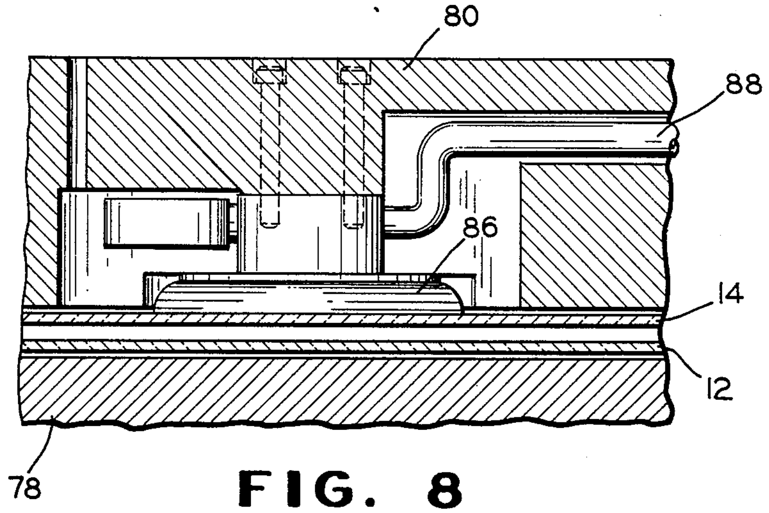
FIG. 8 is an enlarged fragmentary view of the vacuum head portion of the mold assembly of FIGS. 6 and 7 taken along line 8—8 of FIG. 6.
Figure 9:
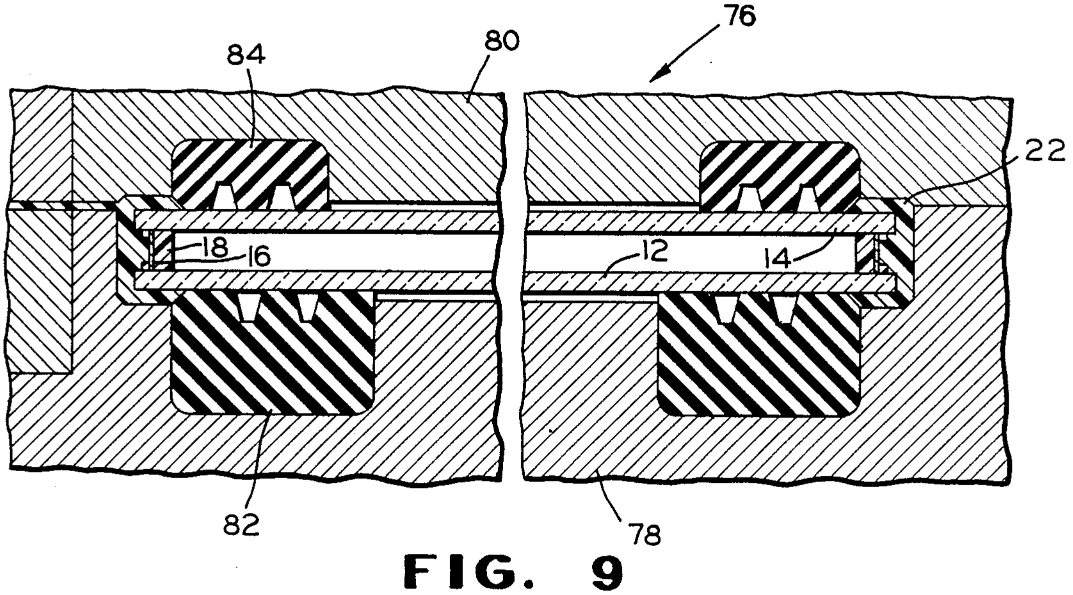
FIG. 9 is an enlarged fragmentary sectional view showing cooperating pad or seal members for supporting a multiple sheet glazing structure during the production of an assembly in accordance with the invention.

A vacuum system of the type illustrated in FIGS. 6 and 8 is disposed in the upper mold section 80 of the mold 76 to carry the glass upwardly along with the die section 80 when the molding operation has been completed and it is desired to remove the multiple glazed structure 10 from the mold 76. The vacuum system consists primarily of a vacuum cup 86 which communicates with a source of vacuum through a vacuum line 88.

In operation, as soon as the cooperating sections 78 and 80 of the mold 76 are clamped together in readiness for receiving the charge of gasket or frame forming reaction mixture, the appropriate charge of the reaction mixture is injected into the mold cavity. Upon polymerization and cure of the reaction mixture, the mold sections 78 and 80 are opened. The final assembly 10 is then freed from the mold sections. Any excess gasket material or flash may be removed at station 102, the assemblage washed and dried at station 110, and a coating 28 of paint may be applied to the outer exposed portion of the frame 22, and baked to cure at the station 120 (illustrated schematically in FIG. 4).

The following example constitutes the best mode presently contemplated by the inventor. It is to be construed as illustrative, and not as limiting.

EXAMPLE

The surfaces of the upper and lower mold sections 80 and 78 which surround the gasket or frame-forming mold cavity between the two, when assembled, are treated with a solvent-based mold release agent which is a blend of waxes; the particular mold release agent is commercially available from Park Chemical Company under the trade designation PRC-789. Glass sheets 12 and 14 with the associated spacer strip 16 and desiccant strip 18 are then appropriately positioned on the lower mold 78, after which the upper mold 80 is mated with the lower mold 78, and the two are clamped together. A charge composed of one part by weight of a polyol composition and 0.63 part by weight of an isocyanate is then forced into the mixing head 74 under a pressure of 2,500 psi and from thence into the mold 76 at a pressure of approximately 50 psi. The polyol and isocyanate streams are maintained at a temperature of about 100° F., while the mold 76 is maintained at a temperature of approximately 145° F. The polyol and isocyanate streams are thoroughly mixed in the head 74, before they reach the mold 76. Approximately one and one-half minutes after the urethane composition is injected therein, the mold 76 is opened, and the assembly 10 removed therefrom.

The resulting elastomeric frame 22 is microcellular, having a specific gravity of 1.07 g/cc, a hardness (Shore "A") of 90, a tensile strength of 1500 psi, a percent elongation at break of 279 and a flexural modulus (at 75° F.) of approximately 3500 psi.

The polyol composition used in carrying out the procedure described in the foregoing example is composed of 100 pounds of a base polyol, such as, for example a 6000 molecular weight polyether triol with ethylene oxide "capping", sold under the trademark "Voranol" 5815 by the Dow Chemical Company; 10 pounds of ethylene glycol; and 3 pounds of 20% carbon black in polyol. The base polyol may alternatively be a lower molecular weight material, including an amine polyol.

The isocyanate used in practicing the procedure of the foregoing example is a modified 4,4' diphenyl methane diisocyanate sold under the trademark Rubinate LF 179 by the Rubicon Chemicals Co.

The above constituents are catalyzed by the addition of dibutyl tin dilaurate, and a solution of triethylenediamine in dipropylene glycol.

It will be appreciated that various changes and modifications can be made from the specific details of the instant invention as described above without departing from the spirit and scope thereof as defined in the appended claims. For example, while the preformed insulating assembly 10 has been described as a window structure for an opening in a building, it must be clearly understood that an assembly according to the invention will function equally well in any fixed glazing application including architectural, appliance, and boating environments.

While the preferred embodiment of the invention utilizes a composition of polyurethane to achieve the desired results, other compositions of nylons, polyesters and epoxies may be suitably utilized as the frame or gasket forming material.

What is claimed is:

1. A method of fabricating an encapsulated multiple sheet insulating glazing unit comprising the steps of:

(a) cleaning the peripheral marginal surfaces and peripheral edges of at least two glass sheets;

(b) applying at least one layer of a primer to the cleaned marginal surfaces and edges of said sheets;

(c) placing a first one of said sheets into a first mold element having a first cavity surrounding said first sheet;

(d) disposing spacer strip means on a surface of said first sheet continuously around the peripheral margin of said first sheet and spaced inwardly from the edges thereof;

(e) placing the second one of said sheets opposite said first sheet in superposed aligned relationship therewith and with its facing surface in engagement with said spacer strip means, whereby said spacer strip means functions to space the facing surfaces of said first and second sheets at a predetermined distance from one another and define an enclosed space between said sheets;

(f) disposing a second mold element over said second sheet in mating relationship with said first mold element, said second mold element including a second cavity cooperating with said first cavity to define, with said spacer strip means and the included surfaces and edges of said sheets, an enclosed mold cavity in surrounding and overlapping relation to the peripheral marginal edges of said spaced first and second sheets;

(g) injecting into the mold cavity a composition which is capable of polymerization and cure to form a polymerized frame encasing the marginal edges of said sheets to hermetically seal said enclosed space between said sheets, said composition, incident to curing, intimately contacting and thereby tightly adhering directly to the exposed primed peripheral marginal surfaces and edges of said sheets and to the spacer means as a result of the autogenous pressure generated incident to polymerization within the enclosed mold cavity;

(h) regulating the pressure at which said composition is injected into the mold cavity to maintain a pressure within the mold cavity below that at which said glass sheets and spacer means would be damaged;

(i) controlling the temperature of the mold cavity, the injection of the composition, and the amount of the composition injected so that as the composition polymerizes following its injection, it is urged into direct intimate contact with the mold cavity, spacer strip means and exposed, primed marginal surfaces and edges of said sheets by the autogenous pressure generated during the polymerization and cures while in such contact into an architectural frame; and (j) removing the glass sheets and integral frame from the mold elements as an assembly.

2. The method according to claim 1, further comprising the step of:

(k) applying a protective coating to an outer surface of the architectural frame.

3. The method according to claim 2, further comprising the step of:

(l) baking the coating after the coating is applied to the frame.

* * * * *